United States Patent
Foster et al.

(10) Patent No.: US 11,341,937 B2
(45) Date of Patent: May 24, 2022

(54) METHOD AND SYSTEM TO CONVEY BATTERY DEGRADATION

(71) Applicant: Intel Corporation, Santa Clara, CA (US)

(72) Inventors: Caroline Foster, Santa Clara, CA (US);
Denny Iriawan, Santa Clara, CA (US);
Barnan Das, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 137 days.

(21) Appl. No.: 16/728,258

(22) Filed: Dec. 27, 2019

(65) Prior Publication Data

US 2020/0135152 A1    Apr. 30, 2020

(51) Int. Cl.
*G09G 5/377* (2006.01)
*G06F 1/28* (2006.01)
*G09G 5/02* (2006.01)

(52) U.S. Cl.
CPC .............. *G09G 5/377* (2013.01); *G06F 1/28* (2013.01); *G09G 5/02* (2013.01); *G09G 2340/12* (2013.01); *G09G 2354/00* (2013.01)

(58) Field of Classification Search
CPC ...... G09G 5/377; G09G 5/02; G09G 2340/12; G09G 2354/00; G06F 1/28
See application file for complete search history.

(56) References Cited

U.S. PATENT DOCUMENTS

| | | | |
|---|---|---|---|
| 6,191,557 B1 * | 2/2001 | Gray | H01M 10/4257 320/132 |
| 2007/0063675 A1 * | 3/2007 | Walline | H01M 10/488 320/132 |

OTHER PUBLICATIONS https://osxdaily.com/2018/04/25/how-check-battery-health-iphone/—published on Apr. 25, 2018.
https://support.apple.com/guide/mac-help/check-the-condition-of-your-computers-battery-mh20865/mac—published Nov. 13, 2017.
https://osxdaily.com/2010/07/27/service-battery-indicator-in-mac-os-x/—published Jul. 27, 2010.

* cited by examiner

*Primary Examiner* — Antonio A Caschera
(74) *Attorney, Agent, or Firm* — Hanley, Flight & Zimmerman, LLC

(57) ABSTRACT

A computing system includes a memory configured to store information regarding a battery. The computing system also includes a processor operatively coupled to the memory. The processor is configured to generate a battery status display that includes one or more relationships between a current battery charge of the battery and a current battery capacity of the battery. The processor is also configured to present the battery status display.

19 Claims, 6 Drawing Sheets

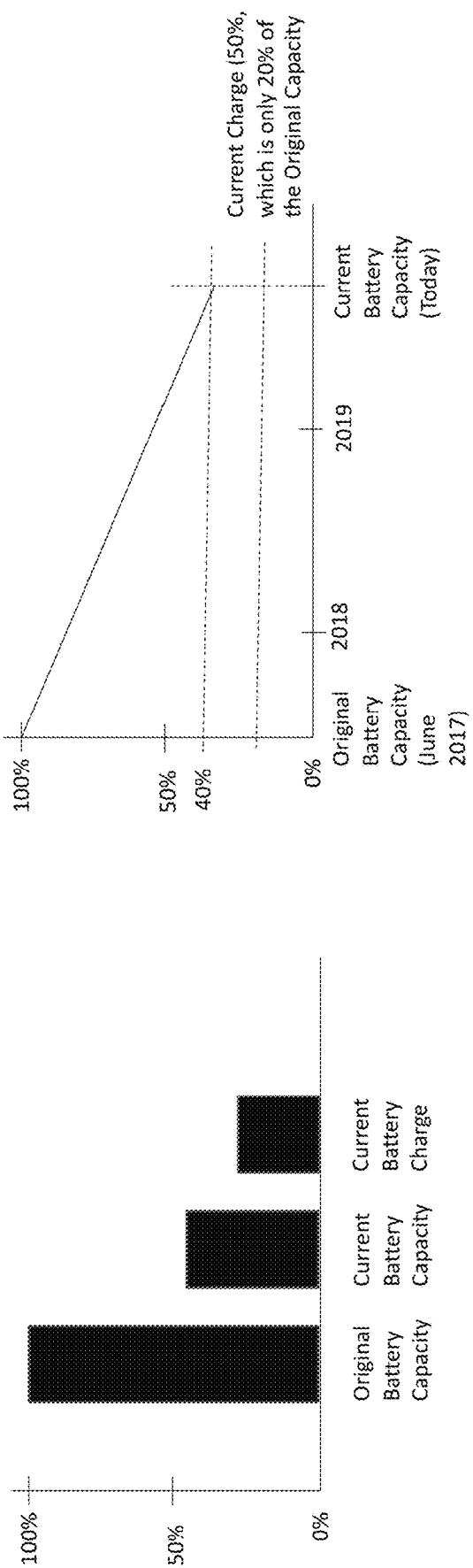

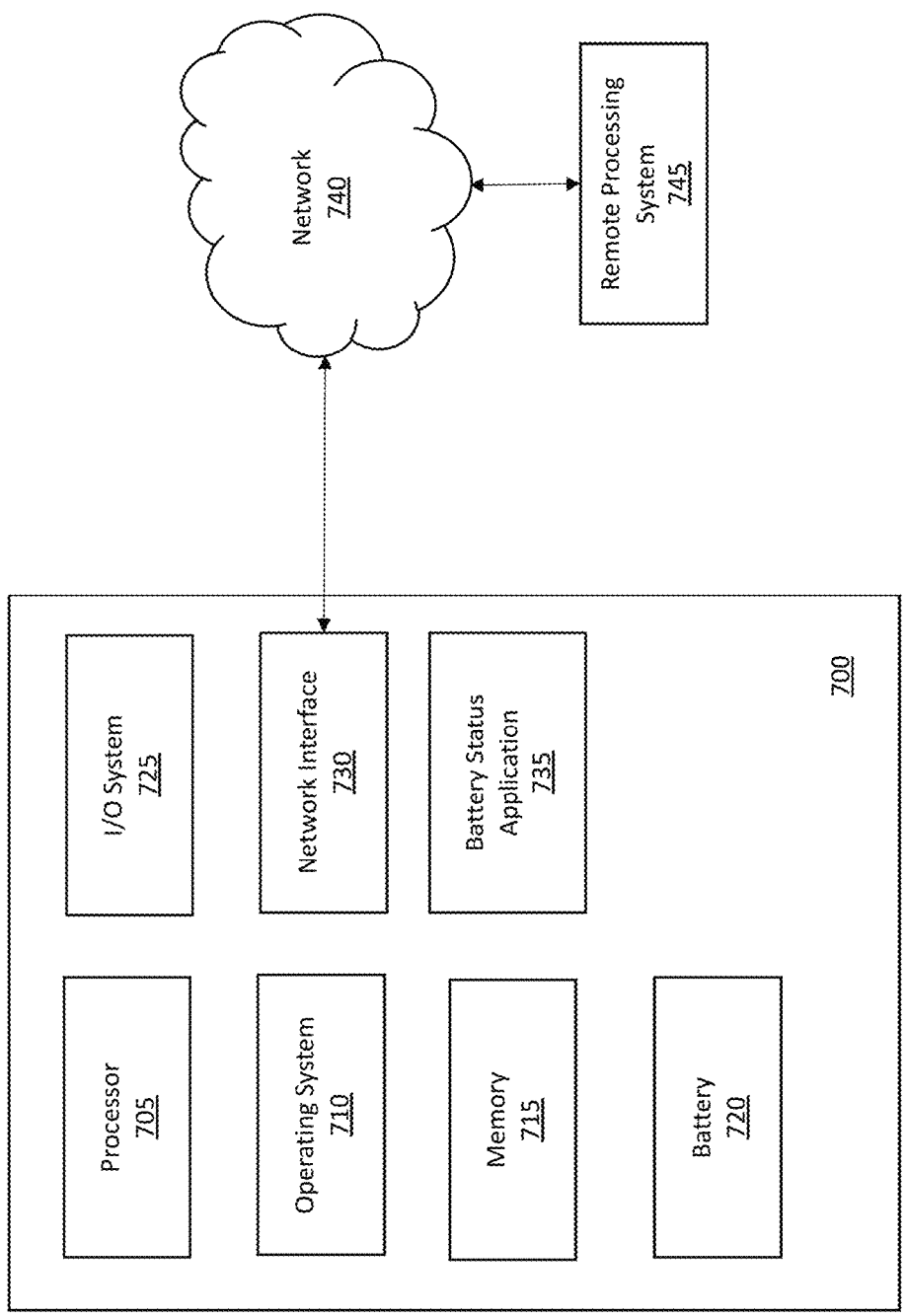

METHOD AND SYSTEM TO CONVEY BATTERY DEGRADATION

BACKGROUND

Many of today's electronic devices are portable or semi-portable, such as cellular phones, laptop computers, computer tablets, portable gaming devices, digital music players, rechargeable speakers, etc. These devices typically include permanent rechargeable batteries (e.g., lithium-ion batteries) that are designed to be recharged numerous times over the course of their useful life. Over time, these rechargeable batteries degrade and are no longer able to hold the same charge as when they were new. The degradation can result from the number of times the battery has been recharged, the voltage or current at which the battery is recharged, the operating conditions to which the battery is subjected, the environmental conditions in which the battery is stored, etc.

BRIEF DESCRIPTION OF THE DRAWINGS

Illustrative embodiments of the invention will hereafter be described with reference to the accompanying drawings, wherein like numerals denote like elements.

FIG. 5 is a bar graph that compares original battery capacity, current battery capacity, and current battery charge in accordance with an illustrative embodiment.

FIG. 6 is a line graph that depicts how battery capacity degrades over time in accordance with an illustrative embodiment.

FIG. 7 is a block diagram of a computing system with a battery status display in accordance with an illustrative embodiment.

DETAILED DESCRIPTION

Figure 1:
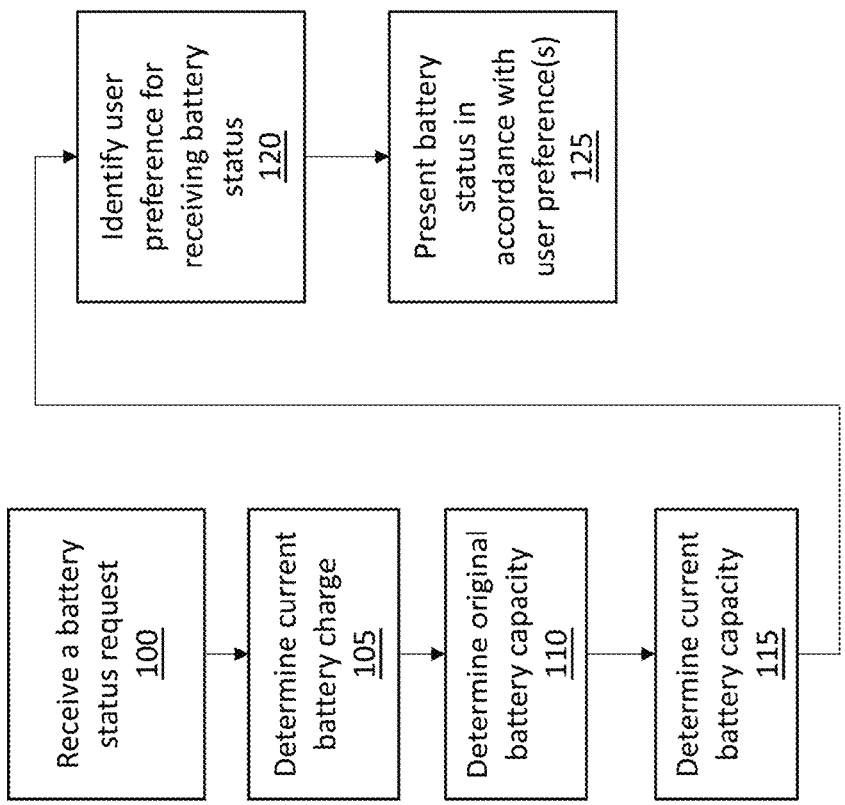
FIG. 1 is a flow chart depicting operations performed by a battery degradation conveyance system in accordance with an illustrative embodiment.

A battery is one of the most important components of a portable electronic device, and the end user's overall experience with the electronic device is often directly correlated to battery performance. The rechargeable batteries used in today's electronic devices degrade over time due to a number of factors, including the number of times the battery has been recharged, the amount to which the battery has been drained prior to recharging, the rate at which the battery is recharged, the age of the battery, the composition of the battery, whether the battery has been exposed to extreme heat or cold, etc. For example, a laptop battery may start out with the capacity to run the computer for 8 hours on a full charge. Over the course of time, the capacity of the battery at full charge declines and may fall to 7 hours on a full charge, 5 hours on a full charge, 2 hours on a full charge, etc. Unfortunately, traditional electronic devices do not adequately convey how battery status changes over time, nor do they relate such changes in terms of current charge remaining. As a result, it can be difficult for a normal end user to keep track of and understand battery degradation, and how it affects their electronic device experience.

Most traditional electronic devices include a battery indicator that indicates a current charge of the battery in the device (relative to current battery capacity) so that the user can determine when the device should be plugged in for a battery recharge. Some traditional electronic devices will also provide an alert to the user regarding the general condition of the battery or indicating that the battery should be serviced because it is not functioning properly. Such systems may also alert the user that the battery should be replaced because the battery has reached a certain level of degradation (e.g., 80% degraded, 90% degraded, etc.). Other electronic devices may provide general information regarding battery degradation such as a percentage value that is intended to convey how the current battery capacity (or life) compares to the original capacity of the battery. However, such general information is often times confusing and difficult to understand, especially for individuals that are not computer savvy.

Described herein are methods and systems for intuitively conveying battery degradation information to end users with clear and concise graphics and/or text. In some embodiments, the proposed system includes explanatory visuals that directly associate battery degradation with current battery capacity and remaining time on the current battery charge. The explanatory visuals can include one or more graphics, one or more videos, one or more audio clips, one or textual explanations of the one or more graphics, and/or color coding to convey battery information to the end user. The proposed methods and systems can be implemented as part of the device operating system, as standalone software or an application that can be downloaded to the device, by a remote device in communication with the device, and/or as a cloud-based service. As discussed in more detail below, the proposed methods and systems are also configurable based on user preferences.

FIG. 1 is a flow chart depicting operations performed by a battery degradation information conveyance system in accordance with an illustrative embodiment. In alternative embodiments, fewer, additional, and/or different operations may be performed. Additionally, the use of a flow diagram is not meant to be limiting with respect to the order of operations performed. In an operation 100, the system receives a battery status request from an end user of an electronic device in which the battery is installed. In one embodiment, the battery status request can be initiated by hovering a cursor over a battery icon or other area on a screen of the electronic device. The battery status request can be initiated by selecting a button, opening an application, navigating to a battery section of a settings menu, issuing a verbal request that is interpreted through voice recognition, pressing a touch screen, etc. In an alternative embodiment, a battery status request may not be received. In such an embodiment, the battery status information described herein may be perpetually displayed on a screen of the device.

In an operation 105, the system determines a current battery charge of the battery. In an illustrative embodiment, the current battery charge refers to the amount of charge remaining on the battery relative to the current battery capacity. For example, the current battery capacity may be 80% of the original (new) capacity of the battery, and a 100% amount of charge remaining on the battery refers to the battery having all of its 80% capacity (as compared to new) available to the user. In an alternative embodiment, the current battery charge may be relative to the original (new) capacity of the battery. In such an embodiment, using the same example from above, the current battery charge can be indicated as 80%, which refers to a 100% charge on a battery that is operating at 80% of its original charge capacity. The current battery charge can be calculated, retrieved from a battery application or operating system of the device, received from a sensor or circuit, and/or determined using any other battery percentage determination technique(s) known in the art.

In an operation 110, the system determines the original battery capacity, and in an operation 115 the system determines the current battery capacity. Similar to the current battery charge value, the original and current battery capacities can be calculated, retrieved from a battery application or operating system of the device, received from a sensor or circuit, and/or determined using any other battery capacity determination technique(s) known in the art.

As used herein, current battery capacity refers to the amount of current battery capacity compared to the original battery capacity when the battery was new. The current battery capacity is therefore a measure of degradation of the battery life-to-date. In some embodiments, the original battery capacity can be a value that is set by the battery manufacturer when the battery is new based on an expected battery capacity under normal operating conditions. Alternatively, the original battery capacity can be determined by the system when the battery is new based on the actual amount of charge that the battery is able to store under normal (default) operating conditions (and/or the amount of time that the battery is able to operate under normal operating conditions). In one embodiment, the original battery capacity and/or current battery capacity can be based on the actual operating conditions to which the device is subjected. For example, a first end user may lightly use his/her device to check e-mail and take calls, while a second end user may use his/her device more strenuously to play high resolution video games, stream movies, etc. The amount of time that the battery will typically last these two end users is quite different based on the device usage.

In one embodiment, the capacities can be based at least in part on a user selected category of expected use. The categories can include 'Minimal Use,' 'Medium Use," "Frequent Use,' Extreme Use,' etc. For example, a user may indicate that they expect 'Extreme Use' use in the future, and the original battery capacity, current battery capacity, and current battery charge in terms of time can be adjusted to reflect such an extreme use scenario. The user may alternatively indicate 'Minimal Use,' which will result in higher time values for all of the current battery capacity, the original battery capacity, and the current battery charge. In another alternative embodiment, the system may automatically determine a use category based on actual device usage by the user. For example, a user that routinely streams movies, communicates over Bluetooth®, and conducts video communication may be automatically categorized into a 'Frequent Use' category or an 'Extreme Use' category. Similarly, a user that only checks e-mail and occasionally browses the Internet may be categorized into a 'Minimal Use' category.

In an operation 120, the system identifies a user preference for receiving battery status information. The user preference can be based on a previously made selection by the user that is stored on the system or otherwise accessible by the system. Alternatively, the system may prompt the user to specify how he/she would like to view the battery status information. The system can provide textual and/or visual options to the user for receiving the battery status. These options can include any of the graphical variations depicted herein, pie charts, audio clips, whether to include a textual description, the type(s) of information to be conveyed textually, etc. The user options can also allow the user to generally identify a type of comparison to made between the battery status information. The user options can further allow the user to view or otherwise experience additional information such as a rate of degradation over the life of the device and/or over a user specified time period.

The user options can also allow the user to select a color code for the display, where different colors represent a different condition. The colors in the display can automatically change as the battery degrades over time. For example, an icon representing the current battery capacity may be a first color (e.g., green) until the current battery capacity drops below a first threshold value (e.g., 75%, 80%, 85%, etc.). Upon dropping below the first threshold, the color of the current battery capacity icon can change to a second color (e.g. red or orange) to indicate that the battery degradation is likely negatively affecting the user's experience. In some embodiments, the color of the icon can change again to a third color (e.g., red) when the current battery capacity drops below a second threshold value (e.g., 40%, 50%, 60%, etc.), and so on. An icon representing the current battery charge can also change color as the current battery charge passes threshold values. The threshold values for the current battery charge can be relative to the current battery capacity or original battery capacity, depending on the embodiment. The threshold values (i.e. percentages) that initiate color changes of the icons can be selected by the user, or set by the system.

In an operation 125, the system presents the battery status in accordance with the user preference(s). Depending on the embodiment, the battery status can be displayed for a predetermined amount of time, for an amount of time set by the user, until the user takes some action such as closing a viewing window, until the user touches the display, etc. The display can also be accompanied by a recommended course of action based on the current battery capacity and/or current battery charge. The courses of action can be based on threshold values being exceeded. For example, a first recommended course of action may be triggered when the current battery capacity crosses a first threshold value (e.g., 75% of the original capacity), a second recommended course of action may triggered when the current battery capacity crosses a second threshold value (e.g., 40% of the original capacity), and so on. Similarly, recommended courses of action can be triggered as the current battery charge crosses thresholds. Examples of recommended courses of action can include 'Charge device soon,' 'Charge device immediately,' 'Service device,' 'Restart device to reset battery usage,' 'Replace battery,' 'Replace device,' etc. The thresholds which trigger various recommendations can be set by the system, or specified by the user, depending on the embodiment. Various options for the presentation of battery status are depicted and described with reference to FIGS. 2-6.

Figure 2:
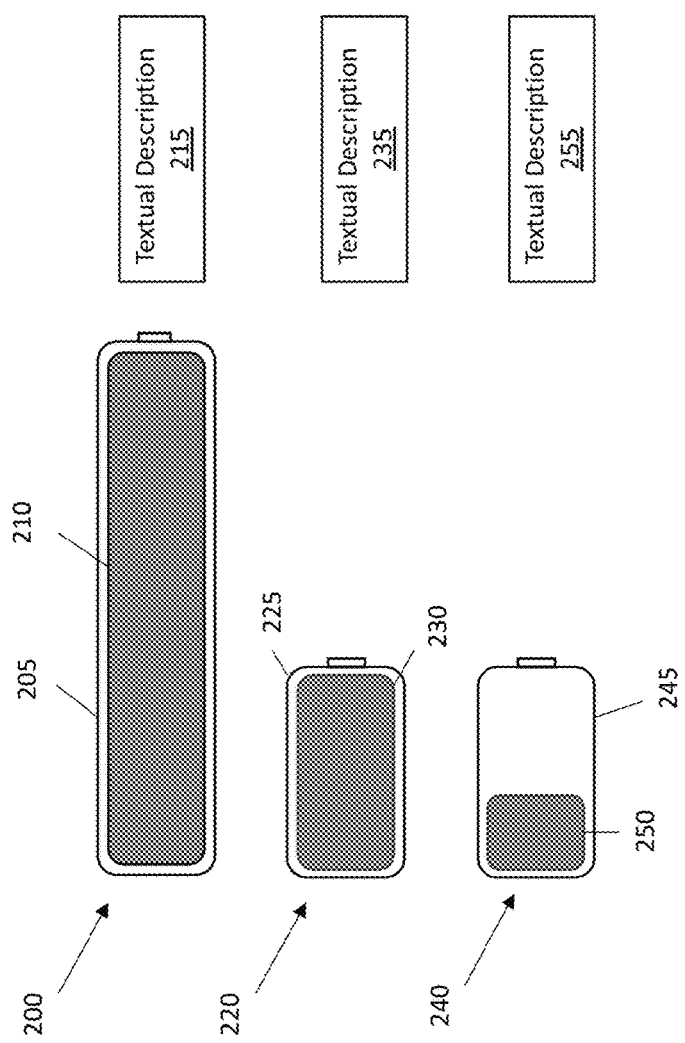
FIG. 2 depicts a battery status display in accordance with a first illustrative embodiment.

FIG. 2 depicts a battery status display in accordance with a first illustrative embodiment. The battery status display of FIG. 2 includes a first battery symbol 200 that is indicative of the original battery capacity. The first battery symbol 200 includes a border 205 and a shaded portion 210, and is accompanied by a textual description 215. The shaded portion 210 substantially fills the border 205, indicating that the first battery symbol 200 is indicative of a full charge (based on the original battery capacity). A length of the first battery symbol 205 correlates to the original/new battery capacity (as compared to the lengths of the second and third battery symbols 220, 240 described below). The textual description 215 is a concise description that clearly conveys the amount of time that the battery lasted when new. In an illustrative embodiment, the amount of time that the battery lasted when new can be based on normal usage by the user/owner of the device. Alternatively, the amount of time that the battery lasted when new can be determined based on an average usage rate across a plurality of users, based on a predetermined or formulaic usage rate, based on actual use over the life of the device, etc. As one example, the textual description 215 may state that "The battery used to last 8 hours per charge," or similar.

The second battery symbol 220 represents the current battery capacity, and is accompanied by a textual description 235. The second battery symbol 220 includes a border 225 and a shaded portion 230. The shaded portion 230 substantially fills the border 225, indicating that the second battery symbol 220 is indicative of a full charge (based on the current battery capacity). In an illustrative embodiment, a length of the second battery symbol 220 corresponds to a proportion of the current battery capacity relative to the original battery capacity. For example, if the original battery capacity was 8 hours and the current battery capacity is 4 hours, the second battery symbol 220 would be ½ of the length of the first battery symbol 200. Similarly, if the original battery capacity was 8 hours and the current battery capacity is 2 hours, the second battery symbol 220 would be ¼ of the length of the first battery symbol 200. The textual description 235 can explain the current battery capacity in terms of time. For example, the textual description 235 can state that "The battery now only lasts 3 hours and 8 minutes per charge," or similar.

The third battery symbol 240 represents the current battery charge. The third battery symbol 240 includes a border 245 and a shaded portion 250. The border 245 is the same length as the border 225 of the second battery symbol 220, which represents current battery capacity. A length of the shaded portion 250 relative to the border 245 indicates the current battery charge. For example, if the shaded portion 250 fills half of the border 245, the current battery charge is 50%. Similarly, if the shaded portion 250 fills one tenth of the border 245, the current battery charge is 10%. The third battery symbol 240 also includes a textual description 255. The textual description 255 indicates the current battery charge, and may for example state that "The time remaining on the current charge is one hour," or similar.

In an alternative embodiment, the textual descriptions 215, 235, and 255 can convey battery status in terms of percentage values. For example, the textual description 215 can state that "The battery started at 100% capacity" (or similar), the textual description 235 can state that "Now the battery is at 32% of its original capacity" (or similar), and the third textual description 255 can state that "There is 35% of the current battery capacity remaining on the current charge," (or similar).

In another illustrative embodiment, the first, second, and/or third battery symbols of FIG. 2 may be color coded to help convey the battery degradation. For example, the border 205 and shaded portion 210 of the first battery symbol 200 may be a first color (e.g., green) to indicate a good (or maximum) condition. The border 225 of the second battery symbol 220 can be a second color (e.g., red) to indicate a bad (i.e., degraded) condition. In some embodiments, the border 225 of the second battery symbol 220 can be colored red (or a different color) as soon as any battery degradation is detected. Alternatively, the border 225 of the second battery symbol 220 can remain the same as the color of the first battery symbol 200 until a threshold amount of battery degradation has been detected, where the threshold can be 5%, 10%, 20%, 25%, etc., depending on the embodiment. The shaded portion 230 of the second battery symbol can be the first color or the second color. The border 245 of the third battery symbol 240 can be the same color as that of the border 225 for the second battery symbol 220. Alternatively, the border 245 may be a different color. The shaded portion 250 of the third battery symbol 240 can be the second color, or a third color (e.g., yellow or orange), depending on the embodiment.

Figure 3:
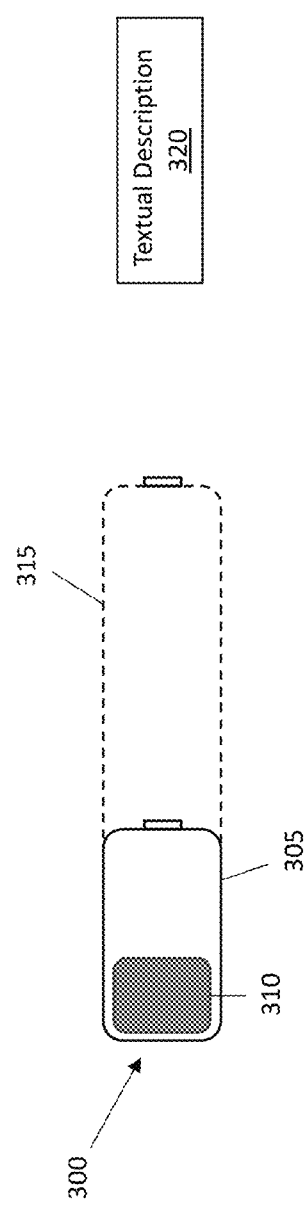
FIG. 3 depicts a battery status display in accordance with a second illustrative embodiment.

FIG. 3 depicts a battery status display 300 in accordance with a second illustrative embodiment. The battery status display 300 includes a border 305, a shaded portion 310, a dashed line portion 315, and a textual description 320. As shown, the battery status display 300 is a stacked display in which border 305 is overlaid on the dashed line portion 315, and the shaded portion 310 is contained within the border 305. The dashed line portion 315 represents the original battery capacity and the border 305 represents the current battery capacity. In an illustrative embodiment, a length of the border 305 section of the display relative to the length of the dashed line portion 315 corresponds to the proportion of the current battery capacity relative to the original battery capacity. For example, if the length of the border 305 is 25% of the length of the dashed line portion 315, that indicates that the current battery capacity is only 25% of the original battery capacity. The length of the shaded portion 310 indicates the amount of current battery charge relative to the current battery capacity, and also relative to the original battery capacity.

The textual description 320 can provide a concise and easy to understand description of the battery status display 300. As one example, the textual description 320 may state that "The time remaining on the current charge is 1 hour. The most the battery can last is 2 hours and 24 minutes. The battery used to last up to 8 hours when new," or similar. Alternatively, different language may be used in the textual description 320, or a textual description may not be used. In another embodiment, the battery status display can be color coded to help the user understand the information being conveyed. As an example, the dashed line portion 315 can be green, the border 305 can be red, and the shaded portion 310 can be orange or yellow. Alternatively, other colors may be used.

Figure 4:
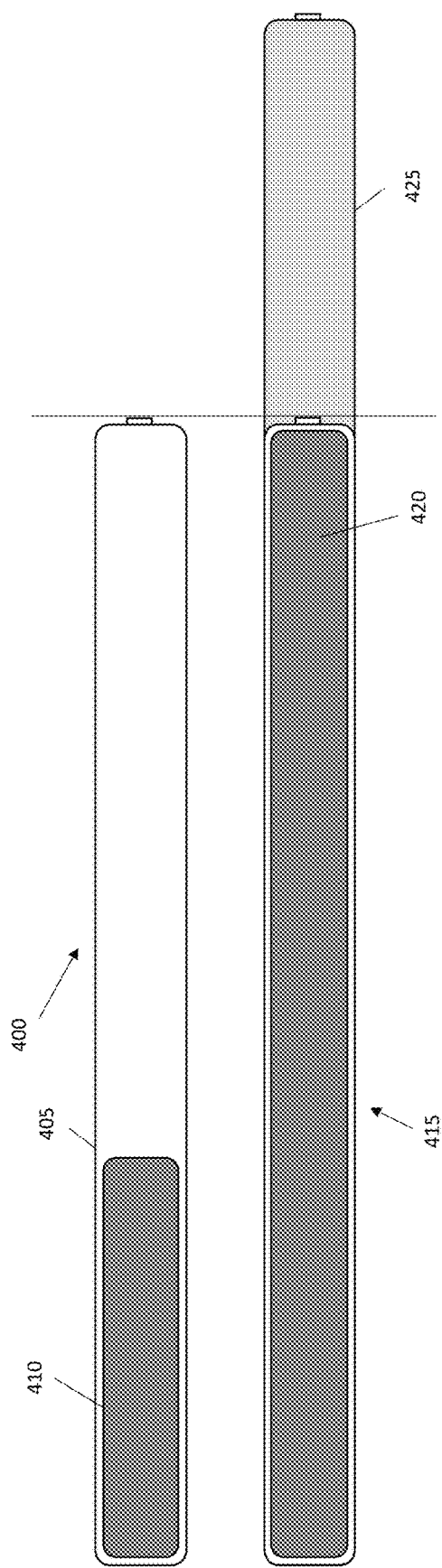
FIG. 4 depicts a battery status display in accordance with a third illustrative embodiment.

FIG. 4 depicts a battery status display in accordance with a third illustrative embodiment. The battery status display includes a first icon 400 that has a border 405 and a shaded portion 410. The border 405 represents the current battery capacity, and the shaded portion 410 represents the current battery charge. The length of the shaded portion 410 relative to the length of the border 405 is proportional to the current battery charge relative to the current battery capacity. The battery status display also includes a second icon 415 that includes a first shaded portion 420 overlaid onto a second shaded portion 425. The first shaded portion 420 represents the current battery capacity and the second shaded portion 425 represents the original battery capacity. In some embodiments, the battery status display of FIG. 4 may be color coded, and different colors can used for the various components of the display. Additionally, in some embodiments a textual description can accompany the display to describe what is being shown. Any of the embodiments of FIGS. 2-4 can also include one or more percentage values within the display to convey the exact percentage value represented by the icons for current battery charge, current battery capacity, and/or original battery capacity.

FIGS. 2-4 depict examples of various battery status displays that can be used in accordance with illustrative embodiments. In alternative embodiments, any other type of display icon(s) may also be used, such as a pie graph/chart, a line graph with an x/y Cartesian coordinate system, a bar graph, etc. Additionally, different types of battery status information and/or information comparisons may be conveyed. As an example, FIG. 5 is a bar graph that compares original battery capacity, current battery capacity, and current battery charge in accordance with an illustrative embodiment. The bar graph of FIG. 5 can be a standalone battery status display, or can be incorporated in to any of the battery status displays of FIGS. 2-4. In at least some embodiments, the bar graph of FIG. 5 can be accompanied by a textual description that explains what is depicted in the bar graph. The textual description can also convey current battery charge relative to current battery capacity. For example, the textual description can state "Your current battery charge is 57% of the current battery capacity. Your current battery capacity is only 46% of the original battery capacity. Your current battery charge is only 26% of the original battery capacity," or similar.

As another example, FIG. 6 is a line graph that depicts how battery capacity degrades over time in accordance with an illustrative embodiment. The x-axis represents time and the y-axis represents the percentage of battery capacity. The x-axis can start at the date of purchase of the device or the date on which the device was activated. The start date on the x-axis can also be user selectable such that the user can view battery degradation over a selected period of time. The end date of the x-axis can be the current date, or a date selected by the user. Also shown in FIG. 6 is a dashed line depicting the current battery charge relative to both the original battery capacity and the current battery capacity. In some embodiments, the line graph of FIG. 6 can be accompanied by additional textual description that explains the graph. The additional textual description can also provide additional information such as the rate of battery degradation on a per day, per week, per month, per year, etc. basis, a recommended course of action, etc.

Other variations of graphs, pictures, charts, videos, text, etc. to convey and compare battery status information can be used in alternative embodiments. The comparisons can include comparisons of original battery capacity to one or both of current battery capacity and current battery charge, comparisons of current battery capacity to one or both of original battery capacity and current battery charge, and/or comparisons of current battery charge to one or both of original battery capacity and current battery capacity. In some embodiments, all or a portion of the battery status can be conveyed via audio such that the user is able to listen to the battery status. The audio can take the place of the display (i.e., any chart, graph, etc.). Alternatively, the audio can accompany the display, and can include a recitation of any textual description that is included in the display.

FIG. 7 is a block diagram of a computing system 700 with a battery status display in accordance with an illustrative embodiment. The computing system 700 includes a processor 705, an operating system 710, a memory 715, a battery 720, an I/O system 725, a network interface 730, and a battery status application 735. In alternative embodiments, the computing system 700 may include fewer, additional, and/or different components. The components of the computing system communicate with one another via one or more buses or any other interconnect system. In an illustrative embodiment, the computing system 700 can be part of a portable user device such as a cellular phone, laptop computer, tablet, portable gaming device, music player device, etc.

The processor 705 can be any type of computer processor known in the art, and can include a plurality of processors and/or a plurality of processing cores. The processor 705 can include a controller, a microcontroller, an audio processor, a graphics processing unit, a hardware accelerator, a digital signal processor, etc. Additionally, the processor 705 may be implemented as a complex instruction set computer processor, a reduced instruction set computer processor, an x86 instruction set computer processor, etc. The processor 705 is used to run the operating system 710, which can be any type of operating system.

The operating system 710 is stored in the memory 715, which is also used to store programs, network and communications data, peripheral component data, battery data such as current battery capacity and original battery capacity, the battery status application 735, and other operating instructions. The memory 715 can be one or more memory systems that include various types of computer memory such as flash memory, random access memory (RAM), dynamic (RAM), static (RAM), a universal serial bus (USB) drive, an optical disk drive, a tape drive, an internal storage device, a non-volatile storage device, a hard disk drive (HDD), a volatile storage device, etc. The battery 720 can be any type of rechargeable battery that is used to power the computing system 700. In an illustrative embodiment, the battery 720 can be a lithium-ion battery. Alternatively, any other type of battery may be used.

The I/O system 725 is the framework which enables users and peripheral devices to interact with the computing system 700. The I/O system 725 can include a mouse, a keyboard, one or more displays, a speaker, a microphone, etc. that allow the user to interact with and control the computing system 700. The I/O system 725 also includes circuitry and a bus structure to interface with peripheral computing devices such as power sources, USB devices, peripheral component interconnect express (PCIe) devices, serial advanced technology attachment (SATA) devices, high definition multimedia interface (HDMI) devices, proprietary connection devices, etc. In an illustrative embodiment, the I/O system 725 is configured to present the user with a battery status display in response to a user request. Alternatively, the I/O system 725 may perpetually provide the user with the battery status display (e.g., on a portion of the display screen of the user device).

The network interface 730 includes transceiver circuitry that allows the computing system to transmit and receive data to/from other devices such as remote computing systems, servers, websites, etc. The network interface 730 enables communication through the network 740, which can be in the form of one or more communication networks and devices. For example, the network 740 can include a cable network, a fiber network, a cellular network, a wi-fi network, a landline telephone network, a microwave network, a satellite network, etc. and any devices/programs accessible through such networks. The network interface 730 also includes circuitry to allow device-to-device communication such as Bluetooth® communication.

The battery status application 735 includes hardware and/or software, and is configured to perform any of the operations described herein. Software of the battery status application 735 can be stored in the memory 715. As an example, the battery status application 735 includes computer-readable instructions to receive and process a battery status request from a user. The battery status request can be performed by hovering a cursor over a specific area on a display, by selecting an icon, by navigating a menu, by issuing a verbal request, etc. To process the request, the battery status application 735 can determine a format to be used for displaying information. The format can be a default format or user specified format, as described herein. The battery status application 735 also determines the relevant battery status information to populate the identified format. For example, the battery status application 735 can determine/retrieve the current battery capacity, original battery capacity, and current battery charge. The battery status application 735 can also determine any textual description that is to accompany the display. The battery status application 735 can further present the battery status display to the user, along with any triggered recommended courses of action.

The computing system 700 is in communication with a remote processing system 745 via the network 740. In an illustrative embodiment, the remote processing system 745 can be used to perform any of the processing operations described herein. The remote processing system 745 can also be used to provide any of the battery status information to the battery status application 735 or other component of the computing system 700. In some embodiments, the remote processing system 745 can house some or all of the battery status application 735. In an alternative embodiment, the remote processing system 745 may not be used.

EXAMPLES

Embodiments disclosed herein can be implemented as hardware, software, firmware, and/or special purpose processing devices. As an example, a non-transitory computer-readable storage medium has instructions stored thereon that, when executed by one or more processors, cause operations described herein to be performed, such as receiving a user request for battery information, processing the request, receiving and processing user preference information regarding the type/format of the display and/or threshold values that the affect the display, obtaining and/or determining relevant battery information to populate the display, presenting the display, etc. The instructions can be encoded using a programming language such as C, C++, Java, JavaScript, Visual Basic, proprietary languages, etc. The instructions are provided in the form of software applications tangibly embodied on storage medium.

The non-transitory computer-readable medium can be any type of medium able to store digital information, such as a hard drive, a server, a flash memory, random access memory (RAM), a combination of memories, etc. In some embodiments, the components described herein can be implemented using hardware such as field-programmable gate arrays (FPGAs), application-specific integrated circuits (ASICs), etc. It should be apparent that any suitable combination of hardware, software, and firmware can be used to implement the described embodiments, and that the described embodiments are not limited to any particular architecture.

Another example embodiment is a computing system that includes a memory configured to store information regarding a battery. The information can include user preferences for a battery status display, one or more dates associates with the battery such as a date of first use, an original battery capacity of the battery, a current battery capacity of the battery, a current battery charge of the battery, etc. The battery can be part of the computing system, or independent and remote from the computing system, depending on the configuration of the system. The computing system also includes a processor operatively coupled to the memory. The processor is configured to generate a battery status display that includes one or more relationships between the current battery charge, the current battery capacity, and the original battery capacity of the battery. The processor is also configured to present the battery status display. The battery status display can be presented as one or more visual icons, graphs, charts, videos, textual descriptions, etc. via a display, speaker, and/or other interface of the computing system.

In some embodiments of the computing system, the processor is configured to receive and process a user preference of a format of the battery status display. The format can include a type of graphic to display such as a pie chart, bar graph, line graph, etc. The format can also include a color scheme for the battery status display. For example, the user may be able to select from a black-and-white display and a color display. The user may also be able to specify which colors will appear in the battery status display as information associated with the battery crosses threshold values. The format can also include a selection of which information and relationship(s) between battery values will be depicted in the battery status display.

In some embodiments of the computing system, the processor is also configured to determine whether one or more of the battery values are below a threshold value, and to take action if the determination is affirmative. For example, if it is determined that the current battery capacity is below a threshold value, the processor can present a recommendation regarding the battery along with the battery status display. The recommendation can be to service the device, replace the battery, restart the device, etc. The threshold value can be set by the user or a default value set by the system, and can represent the ratio of the current battery capacity to the original battery capacity. In some implementations, multiple different messages may be triggered based on the passing of multiple thresholds. As an example, the messages may become more urgent as the current battery capacity drops lower. As another example, it may be determined that the current battery charge is below a threshold value, which can trigger a message instructing the user to charge the battery soon. Multiple thresholds and corresponding messages can also be used based on the current battery charge.

In some embodiments of the computing system, the processor is configured to generate a textual description that describes the one or more relationships between the current battery charge, the current battery capacity, and the original battery capacity. The processor also presents the textual description with the battery status display. The textual description is concise and can describe all of the data depicted in the battery status display. The textual description can also include additional relationships between the data and/or additional data that is not included in the battery status display.

In some embodiments of the computing system, the processor is configured to determine whether the current battery capacity is below a threshold value. The processor is also configured to determine, in response to a determination that the current battery capacity is below the threshold value, one or more colors to include in the battery status display. For example, an icon or portion of an icon representing the current battery capacity can be a first color if the current battery capacity is at or above a threshold capacity value, and a second color if the current battery capacity is below the threshold capacity value. The threshold capacity value can be set by the user or by the system, depending on the embodiment.

In some embodiments of the computing system, the processor generates the battery status display such that it includes a first icon and a second icon, where a length of the first icon represents the original battery capacity and a length of the second icon represents the current battery capacity relative to the original battery capacity. The battery status display can also include a third icon that has a border and a shaded portion, where the border has the length of the second icon, and where a length of the shaded portion represents the current battery charge relative to the current battery capacity.

In other embodiments of the computing system, the battery status display includes a first border overlaid onto a second border, and a shaded portion overlaid onto the first border. A length of the first border corresponds to the current battery capacity, a length of the second border corresponds to the original battery capacity, and a length of the shaded portion corresponds to the current battery charge. In another embodiment, the battery status display includes a first icon and a second icon. The first icon includes a first shaded portion and a first border that surrounds the first shaded portion. A length of the first shaded portion corresponds to the current battery charge and a length of the first border corresponds to the current battery capacity. The second icon includes a second border overlaid onto a third border, where the second border has the length of the first border, and a length of the third border corresponds to the original battery capacity.

In some embodiments, the battery status display can convey battery degradation over a time period. As an example, the battery status display can include a line graph that displays how much the battery has degraded over a given time period. The time period can be selected by the user, or based on a system default such as life-to-date of the phone. In one embodiment, an x-axis of the line graph can include a start date slider and/or an end date slider that the user can adjust to set the start/end dates for the time period during which battery degradation is to be displayed. The line graph can also include an indication of the current charge relative to both the original battery capacity and the current battery capacity.

The processor of the computing system is also configured to determine a rate of battery degradation over a time period, and to present the rate of battery degradation in the battery status display. The time period over which the rate of battery degradation is determined can be set by the user or a default of the system. For example, the rate of battery degradation may be in terms of a percentage of degradation per week, a percentage of degradation per month, a percentage of degradation per year, etc.

In some embodiments, the processor retrieves the battery information from an operating system of the device, from an application associated with the battery, from a remote monitoring device, from one or more sensors or circuits, from a manufacturer of the device or battery (e.g., the original battery capacity), etc. Alternatively, the processor can determine one or more pieces of battery information using any techniques known in the art. In some embodiments, the determination of one or more of the current battery capacity, the current battery charge, and the original battery capacity can be based on usage of the computing system. The usage can be actual usage over a time period as monitored by the processor or a remote device. The usage can also be an expected usage category selected by the user and received as a user preference.

In another embodiment, a method of presenting battery status information is provided. The method includes determining, by a processor of a computing system, a current battery charge of a battery, a current battery capacity of the battery, and an original battery capacity of the battery. The determining can be performed by retrieving the battery status information from another source, as described herein. Alternatively, the determining can be implemented by actual calculations performed by the processor based on usage statistics of the system, battery specifications, battery data, etc. The method also includes generating, by the processor, a battery status display that includes one or more relationships between the current battery charge, the current battery capacity, and the original battery capacity. Any of the relationships described herein can be included in the battery status display. The method also includes presenting the battery status display. The battery status display can be presented as a video, as an audio clip, as text and graphics, etc. using one or more components of the system such as a display or speaker.

In some embodiments, the method further includes generating, by the processor, a textual description that describes the one or more relationships, and presenting the textual description with the battery status display. In other embodiments, the method includes identifying, by the processor and based on a user preference, a format for the battery status display. In such an embodiment, generating the battery status display can include populating the format with the battery status information and/or relationships therebetween.

Another embodiment includes a non-transitory computer-readable storage medium having computer-readable instructions stored thereon that, upon execution by one or more processors in a computing system, result in operations being performed. The operations include determining a current battery charge of a battery, a current battery capacity of the battery, and an original battery capacity of the battery. The operations also include generating a battery status display that includes one or more relationships between the current battery charge, the current battery capacity, and the original battery capacity. The operations further include presenting the battery status display. The operations can also include determining whether the current battery capacity is below a threshold value, and presenting, in response to a determination that the current battery capacity is below the threshold value, a recommendation regarding the battery along with the battery status display. The recommendation can be to replace the battery, service the battery, replace the device, turn off the device, etc.

The embodiments described herein have focused on the use of a system for conveying battery and battery degradation for a computing device such as a laptop computer or cellular phone. However, the proposed system is not limited to portable device batteries, but can also be used to convey information regarding any type of battery. For example, in one embodiment, the proposed system can be incorporated into a computing system for a vehicle (e.g., combustion engine vehicle, electric vehicle, hybrid vehicle, etc.), and the battery information conveyed to the user can be with respect to the vehicle battery or battery bank. Similarly, the proposed system can be used to convey and display information regarding recreational vehicle batteries, solar charging system batteries, wind charging system batteries, etc.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A computing system comprising:
   memory to store information regarding a battery;
   instructions; and
   processor circuitry communicatively coupled to the memory, the processor to execute the instructions to:
     generate a battery status that includes a relationship among a current battery charge of the battery, a current battery capacity of the battery, and an original battery capacity of the battery, the original battery capacity different from the current battery capacity; and
     cause presentation of the battery status as a battery status image on a display, the battery status image indicative of the relationship,
   wherein the battery status image is to convey battery degradation over a time period by showing a change from the original battery capacity at a first time and the current battery capacity at a second time, the second time after the first time.

2. The computing system of claim 1, wherein the processor circuitry is to cause the presentation of the battery status image to reflect a user preference of a format.

3. The computing system of claim 1, wherein the processor circuitry is to:
   determine whether the current battery capacity is below a threshold value; and
   in response to a determination that the current battery capacity is below the threshold value, cause presentation of a recommendation regarding the battery along with the battery status image.

4. The computing system of claim 1, wherein the processor circuitry is to:
   generate a textual description that describes the relationship between the current battery charge and the current battery capacity; and
   cause presentation of the textual description.

5. The computing system of claim 1, wherein the processor circuitry is to:
   determine whether the current battery capacity is below a threshold value; and
   determine, in response to a determination that the current battery capacity is below the threshold value, one or more colors to include in the battery status image.

6. The computing system of claim 5, wherein the processor circuitry is to process a user preference of the one or more colors to include in the battery status image.

7. The computing system of claim 1, wherein the battery status image includes a first icon and a second icon, and wherein a length of the first icon represents the original battery capacity and a length of the second icon represents the current battery capacity relative to the original battery capacity.

8. The computing system of claim 1, wherein the processor circuitry is to process the time period as a user preference.

9. The computing system of claim 1, wherein the processor circuitry is to:
   determine a rate of battery degradation over a time period based on the original battery capacity at a first time and the current battery capacity at a second time, the second time after the first time; and
   present the rate of battery degradation in the battery status image.

10. The computing system of claim 1, wherein the processor circuitry is to determine one or more of the current battery capacity or the original battery capacity based on usage of the computing system.

11. The computing system of claim 10, wherein the usage is based on one or more of an actual usage over a time period or a user selected usage category.

12. A computing system comprising:
    memory to store information regarding a battery;
    instructions; and
    processor circuitry communicatively coupled to the memory, the processor to execute the instructions to:
      generate a battery status that includes a relationship among a current battery charge of the battery, a current battery capacity of the battery, and an original battery capacity of the battery, the original battery capacity different from the current battery capacity; and
      cause presentation of the battery status as a battery status image on a display, the battery status image indicating the relationship,
    wherein the battery status image includes a first icon, a second icon, and a third icon, the third icon has a shaded portion, a length of the first icon represents the original battery capacity, a length of the second icon represents the current battery capacity relative to the original battery capacity, and a length of the shaded portion represents the current battery charge relative to the current battery capacity.

13. A computing system comprising:
    memory to store information regarding a battery;
    instructions; and
    processor circuitry communicatively coupled to the memory, the processor to execute the instructions to:
      generate a battery status that includes a relationship among a current battery charge of the battery, a current battery capacity of the battery, and an original battery capacity of the battery, the original battery capacity different from the current battery capacity; and
      cause presentation of the battery status as a battery status image on a display, the battery status image indicating the relationship,
    wherein the battery status image includes a first border overlaid onto a second border, and a third border overlaid onto the second border, the third border defining a shaded portion, wherein a length of the first border corresponds to the current battery capacity, a length of the second border corresponds to an original battery capacity, and a length of the shaded portion corresponds to the current battery charge.

14. A computing system comprising:
    memory to store information regarding a battery;
    instructions; and
    processor circuitry communicatively coupled to the memory, the processor to execute the instructions to:
      generate a battery status that includes a relationship among a current battery charge of the battery, a current battery capacity of the battery, and an original battery capacity of the battery, the original battery capacity different from the current battery capacity; and cause presentation of the battery status as a battery status image on a display, the battery status image indicating the relationship, wherein the battery status image includes:

a first icon that includes a first shaded portion and a first border that surrounds the first shaded portion, wherein a length of the first shaded portion corresponds to the current battery charge and a length of the first border corresponds to the current battery capacity; and a second icon that includes a second border overlaid onto a third border, the second border has the length of the first border, and a length of the third border corresponds to an original battery capacity.

15. A method of presenting battery status information, the method comprising:

determining a current battery charge of a battery, a current battery capacity of the battery, and an original battery capacity of the battery;

generating, by executing instructions with a processor, a battery status that includes a relationship among the current battery charge, the current battery capacity, and the original battery capacity of the battery, the original battery capacity different from the current battery capacity; and causing presentation of the battery status as a battery status image on a display the battery status image indicating the relationship, the battery status image conveying battery degradation over a time period by showing a change from the original battery capacity at a first time and the current battery capacity at a second time, the second time after the first time.

16. The method of claim 15, further including generating, by executing instructions with the processor, a textual description that describes the one or more relationships, and presenting the textual description with the battery status image.

17. The method of claim 15, further including identifying, by executing instructions with the processor and based on a user preference, a format for the battery status image, and wherein the generating of the battery status image includes populating the format.

18. A non-transitory computer-readable storage medium comprising computer-readable instructions that, when executed, cause one or more processors to at least:

determine a current battery charge of a battery and a current battery capacity of the battery;

generate a battery status that includes a relationship among the current battery charge, the current battery capacity, and an original battery capacity of the battery, the original battery capacity different from the current battery capacity; and output the battery status as a battery status image, the battery status image conveying battery degradation over a time period by showing a change from the original battery capacity at a first time and the current battery capacity at a second time, the second time after the first time.

19. The non-transitory computer-readable storage medium of claim 18, wherein the instructions cause the one or more processors to:

determine whether the current battery capacity is below a threshold value; and output, in response to a determination that the current battery capacity is below the threshold value, a recommendation regarding the battery along with the battery status image.

* * * * *